US008121946B1

(12) United States Patent
Arguello et al.

(10) Patent No.: US 8,121,946 B1
(45) Date of Patent: Feb. 21, 2012

(54) SYSTEM AND METHOD FOR MODULAR ELECTRONIC SIGNATURE BLOCK

(75) Inventors: Michael Arguello, San Antonio, TX (US); Steven Dale Zettner, San Antonio, TX (US); Ron DiGiacomo, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 188 days.

(21) Appl. No.: 11/461,735

(22) Filed: Aug. 1, 2006

(51) Int. Cl.
*G06Q 40/00* (2006.01)

(52) U.S. Cl. .......................................... 705/40; 705/38

(58) Field of Classification Search ............... 705/35–40
See application file for complete search history.

(56) References Cited

U.S. PATENT DOCUMENTS

| | | | | |
|---|---|---|---|---|
| 4,500,750 | A * | 2/1985 | Elander et al. | 705/72 |
| 5,465,299 | A | 11/1995 | Matsumoto et al. | |
| 5,659,616 | A | 8/1997 | Sudia | |
| 5,850,442 | A * | 12/1998 | Muftic | 705/65 |
| 5,878,405 | A * | 3/1999 | Grant et al. | 705/39 |
| 6,021,202 | A * | 2/2000 | Anderson et al. | 705/54 |
| 6,209,095 | B1 | 3/2001 | Anderson et al. | |
| 6,922,697 | B1 | 7/2005 | Suehira | |
| 7,340,424 | B2 * | 3/2008 | Gang et al. | 1/1 |
| 7,533,268 | B1 * | 5/2009 | Catorcini et al. | 713/176 |
| 2001/0047307 | A1 * | 11/2001 | Bennett et al. | 705/26 |
| 2004/0128229 | A1 * | 7/2004 | Raines et al. | 705/38 |
| 2004/0138997 | A1 * | 7/2004 | DeFrancesco et al. | 705/38 |
| 2004/0230512 | A1 * | 11/2004 | Gulati | 705/36 |
| 2005/0021982 | A1 * | 1/2005 | Popp et al. | 713/184 |
| 2005/0234814 | A1 * | 10/2005 | Jones et al. | 705/38 |
| 2006/0259440 | A1 | 11/2006 | Leake et al. | |
| 2007/0118751 | A1 * | 5/2007 | Parlett et al. | 713/176 |
| 2007/0143501 | A1 * | 6/2007 | Pasha et al. | 709/246 |
| 2007/0250920 | A1 | 10/2007 | Lindsay | |

FOREIGN PATENT DOCUMENTS

WO      WO 0152205 A1 *   7/2001

OTHER PUBLICATIONS

"Entrust Securing Digital Identities & Information; Countering On-Line Identity Theft," [online], Copyright 2005 [retrieved on Jan. 26, 2007]. pp. 1-8. Retrieved from the Internet: <URL:http:11www.entrust.com>.
"Single Source F&I Desktop," [online], [retrieved on Feb. 9, 2007]. p. 1. Retrieved from the Internet. <URL: http://www.DealerTrack.com>.
"DealerTrack Financing Sources," [online], 2001 [retrieved on Feb. 9, 2007]. p. 1. Retrieved from the Internet: <URL: http://www.DealerTrack.com>.

* cited by examiner

*Primary Examiner* — Thu-Thao Havan
*Assistant Examiner* — Jennifer Liu
(74) *Attorney, Agent, or Firm* — Brooks, Cameron & Huebsch PLLC

(57) ABSTRACT

Method and system are directed to capturing consumer agreement to the terms of a transaction conducted online. The method/system uses a modular electronic signature block that may be applied to electronic versions of any standardized form. The electronic signature is implemented in a non-invasive way that does not alter or replace the contents of the electronic forms. The modular nature of the electronic signature block allows a separate electronic signature to be used for each online form, or a single electronic signature for multiple online forms. The online forms themselves are generated by populating a generic template of the standardized forms with consumer-specific data. The electronically-signed forms may thereafter be stored as data for a particular template. Such an arrangement provides a more secure, reproducible, verifiable, and unalterable means of capturing consumer consent, thereby allowing consumer transactions to be conducted entirely online.

21 Claims, 19 Drawing Sheets

Welcome to Lender Dealer Network

Home | About Lender | Products & Services | Eligibility | News Center | Employment | Auto Dealers

*Dealer education/ presentations.*

Please enter the Lender transaction ID from your customer and your NADA ID. If you are not a member of NADA, please call 800-888-8888.

Transaction ID  NADA ID
12a45f78e  123456

Transaction Details

This loan is for Steve Harrison who is approved for a loan amount up to $45,000.

Good morning...
Tom Benson Chevrolet
2555 Main St
San Antonio, TX 78222

VIN     Exact Amount Financed     MSRP
$ 35,143.28     $ 40,000

Funding preference:

☐ Personal Check (immediate funds)  Routing #  Account Number
☐ Direct Deposit (2 business days)

Member Authorization
05Mustang
  \
   1320

By clicking "OK" you agree
....

SYSTEM AND METHOD FOR MODULAR ELECTRONIC SIGNATURE BLOCK

CROSS-REFERENCE TO RELATED APPLICATIONS

This application is related to in subject matter, and incorporates by reference, co-pending U.S. patent application Ser. Nos. 11/322,498, 11/322,775, 11/323,202, filed Dec. 30, 2005, and the following co-pending U.S. patent applications: "SYSTEM AND METHOD FOR MODULAR ELECTRONIC SIGNATURE BLOCK," filed Aug. 1, 2006 Ser. No. 11/461,737; and "SYSTEM AND METHOD FOR MODULAR ELECTRONIC SIGNATURE BLOCK," filed Aug. 1, 2006 Ser. No. 11/461,739.

TECHNICAL FIELD

The disclosed embodiments relate generally to online consumer transactions and, more particularly, to a system and method for obtaining an electronic signature pursuant to such transactions.

BACKGROUND

Most major consumer transactions, such as buying a house, an automobile, a business, and the like, involve large amounts of paperwork. The process is even more complicated if financing is required. Not only must the consumer choose from among many types of monetary loans available, he/she must navigate the various loan terms (e.g., interest rates, loan periods, payment options, etc.). Other important factors that must be considered include the type of lending institution (e.g., bank, credit union, etc.), the potential seller (e.g., national chain, local dealer, etc.), and an insurer if needed.

An example of a procedure for conducting a consumer transaction involving a monetary loan is illustrated at 100 in FIG. 1. The specific example of FIG. 1 is an automobile purchase, but the procedure 100 may be applied to other types of consumer transactions as well. A consumer or borrower 102 begins the procedure 100 by calling his/her lending institution (e.g., bank, credit union, etc.) 104 to apply for a monetary loan. After checking the borrower's personal information and credit history, a representative of the lending institution 104 informs the borrower 102 of the loan amount, period, and interest rate that he/she is eligible for. If the borrower 102 agrees to the terms of the loan, the lender representative delivers (e.g., by express mail, courier service, etc.) a "sight draft" 106 to the borrower 102. The "sight draft" 106, when executed, grants to the lending institution 104 a security interest in the purchased automobile as collateral for the monetary loan.

With the "sight draft" 106 in hand, the borrower 102 may proceed to an appropriate automobile dealership 108 and purchase his/her automobile of choice. For the automobile dealership 108, the "sight draft" 106 essentially serves as a check or cash payment from the lending institution 104. The dealership 108 simply fills in the pertinent information on the "sight draft" 106, including the dealership's name, the automobile's vehicle identification number (VIN), and the purchase price, and the borrower 102 physically signs the "sight draft" 106 to complete the transaction.

Throughout the procedure 100, numerous standardized paper forms, such as the "sight draft," are used in order to acquire information from the consumer and to obtain the consumer's assent to certain legal terms. These forms have usually been tailored to suit the specific needs of a particular industry, including various preferences, best practices, legal requirements and the like. Consumers agree to legally bind themselves to the terms stated on the paper forms when they physically sign the forms.

As can be seen from the foregoing, existing procedures for conducting a consumer transaction have a number drawbacks and limitations. For one thing, the lending institution 104 must employ a staff of representatives to receive telephone calls and/or personal visits from the borrower 102 and other consumers. These lender representatives are typically available only during normal business hours (e.g., 9 AM-5 PM), which may not be suitable or convenient for the borrower 102. In addition, because the "sight draft" 106 must be physically delivered to the borrower 102, there is usually a time delay of up to a day or more from the moment the borrower 102 is approved for the monetary loan. Furthermore, some states and/or automobile dealerships do not accept or recognize the legality or validity of the "sight draft" 106.

One way to overcome the above limitations is to conduct the consumer transactions online (i.e., via e-Commerce). However, although beneficial in many ways, online transactions are not entirely free of drawbacks. For example, the standardized paper forms must be replaced with electronic forms, including substituting the physical signature block with an electronic consent or acceptance. Currently, such an electronic consent or acceptance is implemented as a checkbox, like the ubiquitous "I Agree" checkbox, and the consumer simply clicks on the checkbox to convey his/her acceptance of the terms of the transaction. The acceptance is then stored simply as a data point in a field of a remote table or database.

Unfortunately, there is a general reluctance in many industries to alter or modify the content (e.g., provisions, conditions, disclaimers, etc.) of standardized forms to accommodate an electronic consent or acceptance for fear of somehow rendering the forms invalid. Compounding the problem, many standardized forms are established by industry regulations so that their content, including the physical signature block, cannot be validly changed. In addition, there is not enough room on many forms to append an electronic consent or acceptance with sufficient scope to satisfy the same legal requirements as a physical signature block. Moreover, any change to a standardized form may adversely affect subsequent business processes that handle the completed form. Finally, any endeavor to alter or modify the standardized forms would require expenditures of time and resources.

Accordingly, what is needed is a way conducting online transactions that takes advantage of already existing industry-accepted forms. More particularly, what is needed is a way of capturing consumer consent or agreement to the terms of the transactions without having to alter or modify these forms.

SUMMARY

The disclosed embodiments are directed to a method and system of capturing consumer agreement to the terms of a transaction conducted online. The method/system uses a modular electronic signature block that may be applied to electronic versions of any standardized form. The electronic signature is implemented in a non-invasive way that does not alter or replace the content of the electronic forms. The modular nature of the electronic signature block allows a separate electronic signature to be used for each online form, or a single electronic signature for multiple online forms. The online forms themselves are generated by populating a generic template of the standardized forms with consumer-specific data. The electronically-signed forms may thereafter be stored as data for a particular template, as opposed to optical scans of physically-signed forms. Such an arrangement provides a more secure, reproducible, verifiable, and unalterable means of capturing consumer consent, thereby allowing consumer transactions to be conducted entirely online.

BRIEF DESCRIPTION OF THE DRAWINGS

The foregoing and other advantages will become apparent from the following detailed description and upon reference to the drawings, wherein:

FIGS. 4-9, 10A-10C, 11-14, and 15 illustrate exemplary web pages for conducting a consumer transaction requiring a monetary loan;

DETAILED DESCRIPTION

Following is a detailed description with reference to the drawings wherein the same reference labels are used for the same or similar elements. As used throughout this description and the claims, the terms "a" and "an" are intended to mean "one or more."

As alluded to above, existing procedures for conducting a consumer transaction requiring financing or a monetary loan are often confusing, time-consuming, and inconvenient for the average consumer. Various embodiments provide a consumer or borrower the option to conduct such a transaction online, thus avoiding the need for physical documentation, such as "sight drafts" and other loan-related documents, and the complications and delays associated therewith. The consumer or borrower may simply apply for and obtain the financing or loan online at any time by accessing a suitable lending institution over a network connection. Such an arrangement allows loan or financing applications to be processed in real time and funds to be made available quickly without having to rely on lender representatives. Similarly, sellers or dealers may complete the transaction by accessing the lending institution over a network connection to automatically obtain payment for the purchased items. This allows sellers to be paid in real time while avoiding potential legality or validity issues concerning the "sight draft" 106 and other such documents.

Figure 1:
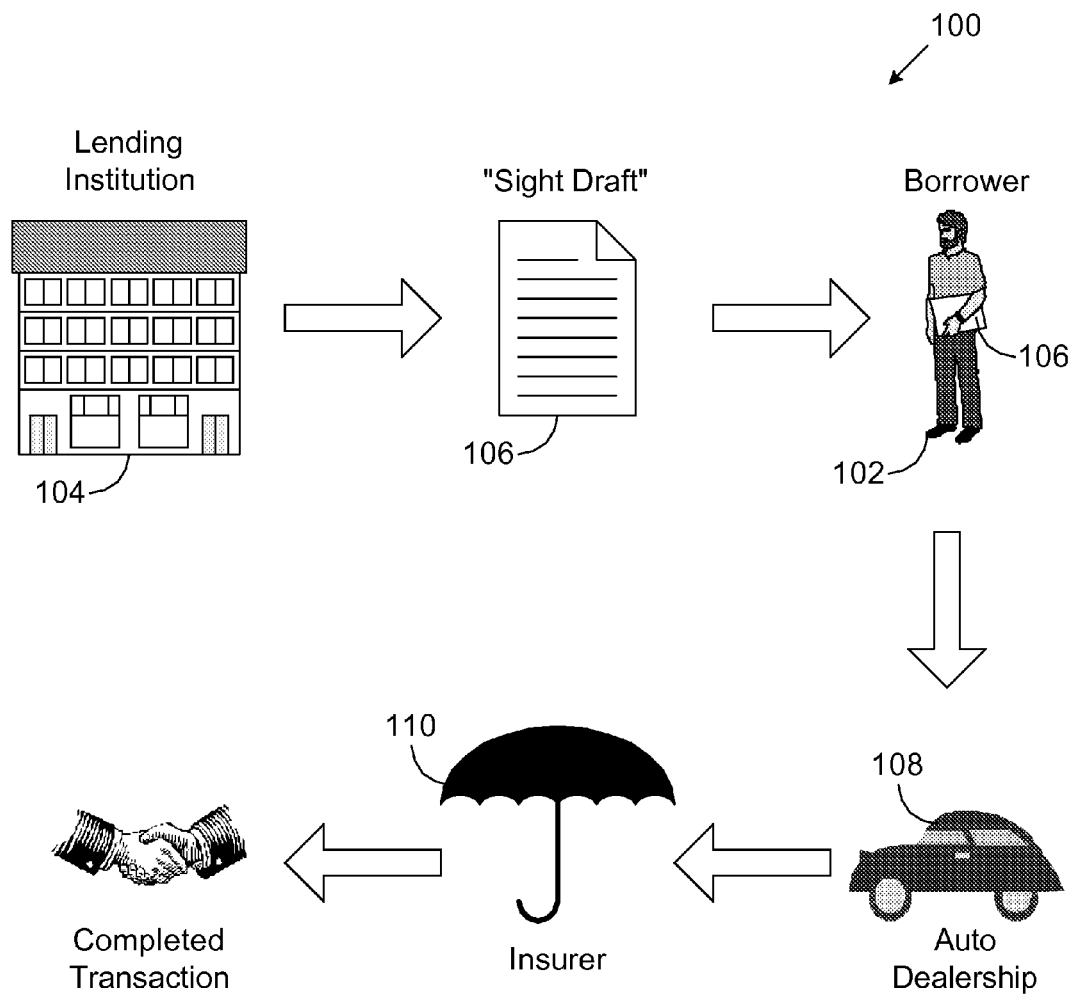
FIG. 1, described previously, illustrates a procedure for conducting a consumer transaction requiring a monetary loan according to the prior art.
Figure 2:
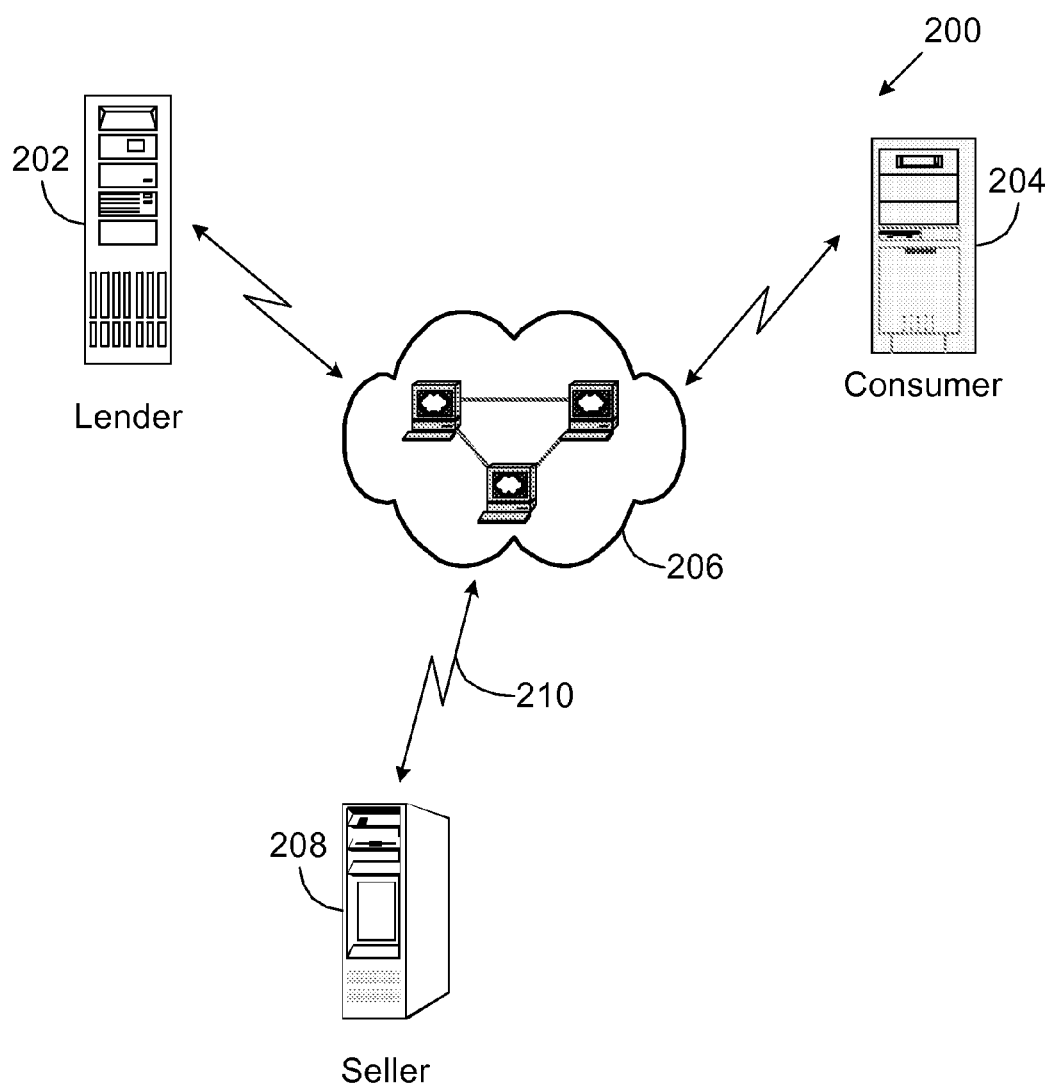
FIG. 2 illustrates an exemplary system for conducting a consumer transaction requiring a monetary loan.

FIG. 2 illustrates a system 200 that may be used to conduct a transaction of the type mentioned above. The system 200 includes a lender computing system 202 connected to a consumer computing system 204 over a network 206. The network 206, which may be a private network or a public network (e.g., the Internet), also connects a seller computing system 208 to the lender computing system 202 (and to the consumer computing system 204). The computing systems 202, 204, and 208 may be any type of computer or computing device suitable for that system's particular requirements, including a mainframe computer, workstation computer, server, desktop computer, laptop computer, cell phone, personal digital assistant (PDA), and the like.

The connection between the network 206 and the various computing systems 202, 204, and 208 may be any suitable network connection, including a wired connection, wireless connection, and/or a combination of both. For simplicity, the connections are shown in FIG. 2 as a double-headed arrow between each computing system 202, 204, and 208 and the network 206. Note also that although only a single lender computing system 202, consumer computing system 204, and seller computing system 208 are shown, those having ordinary skill in the art will understand that multiple instances of each type of computing systems may be connected to one another over the network 206.

When a consumer wishes to conduct a transaction involving financing or a monetary loan, he/she may use the consumer computing system 204 to access the lender computing system 202 and apply for the loan from the lending institution. The lender computing system 202 usually asks the consumer to provide various personal and financial information (e.g., name, date of birth, annual salary, etc.) via the consumer computing system 204. The lender computing system 202 thereafter may send this information over the network 206 to one or more credit reporting bureaus (e.g., Equifax, Experian, TransUnion, etc.) to obtain a report of the consumer's credit history. The credit history report is preferably obtained in real time in order to expedite processing of the loan application, but it is certainly possible to delay the report.

A determination is then made by the lender computing system 202 as to whether the consumer qualifies for financing or a loan based, for example, on his/her credit history and the lending institution's internal lending policies. Assuming the consumer is eligible, the lender computing system 202 notifies the consumer via the consumer computing system 204 of the loan type and amount, the interest rate, the duration of the loan, and other pertinent loan terms. Once the consumer agrees to the terms, the lender computing system 202 generates a unique lender transaction ID that may be used to confirm to a seller that a loan has been made to the particular consumer in question. The lender computing system 202 also asks the consumer at this point to select a personal identification number (PIN) that may be used by the lender computing system 202 to verify the identity of the consumer. The consumer may now proceed to a suitable seller to make his/her purchase.

With the lender transaction ID in hand, the seller is essentially guaranteed that the lending institution will finance the consumer's purchase. In this respect, the lender transaction ID functions in much the same way as the "sight draft" mentioned above, but without the complications and delays associated with the "sight draft." The seller simply accesses the lender computing system 202 via the seller computing system 208 to reference the loan using the lender transaction ID. If the lender transaction ID is valid, the lender computing system 202 asks the seller to provide additional information related to the transaction (e.g., purchase price, vehicle identification number (VIN), year, make, model, etc.). Finally, the lender computing system 202 asks the consumer to enter his/her PIN to verify the identity of the consumer. In some embodiments, the lender computing system 202 may also require the seller to be verified, for example, by checking to see whether the seller is registered with an appropriate industry association or is part of a seller network. In any event, if the PIN is valid, the lender computing system 202 instructs the lending institution to forward funds equal to the indicated purchase price into an account specified by the seller.

Sometimes, the seller may not have a connection to the network 206 and therefore cannot access the lender computing system 202. In that case, the seller may telephone the lending institution (e.g., via a toll-free number) and provide the lender transaction ID. Upon verifying the lender transaction ID, a lender representative may call the consumer at a telephone number previously designated by the consumer, for example, a cell phone number. The consumer may then verify his/her identification to the lender representative to complete the transaction.

Figure 3:
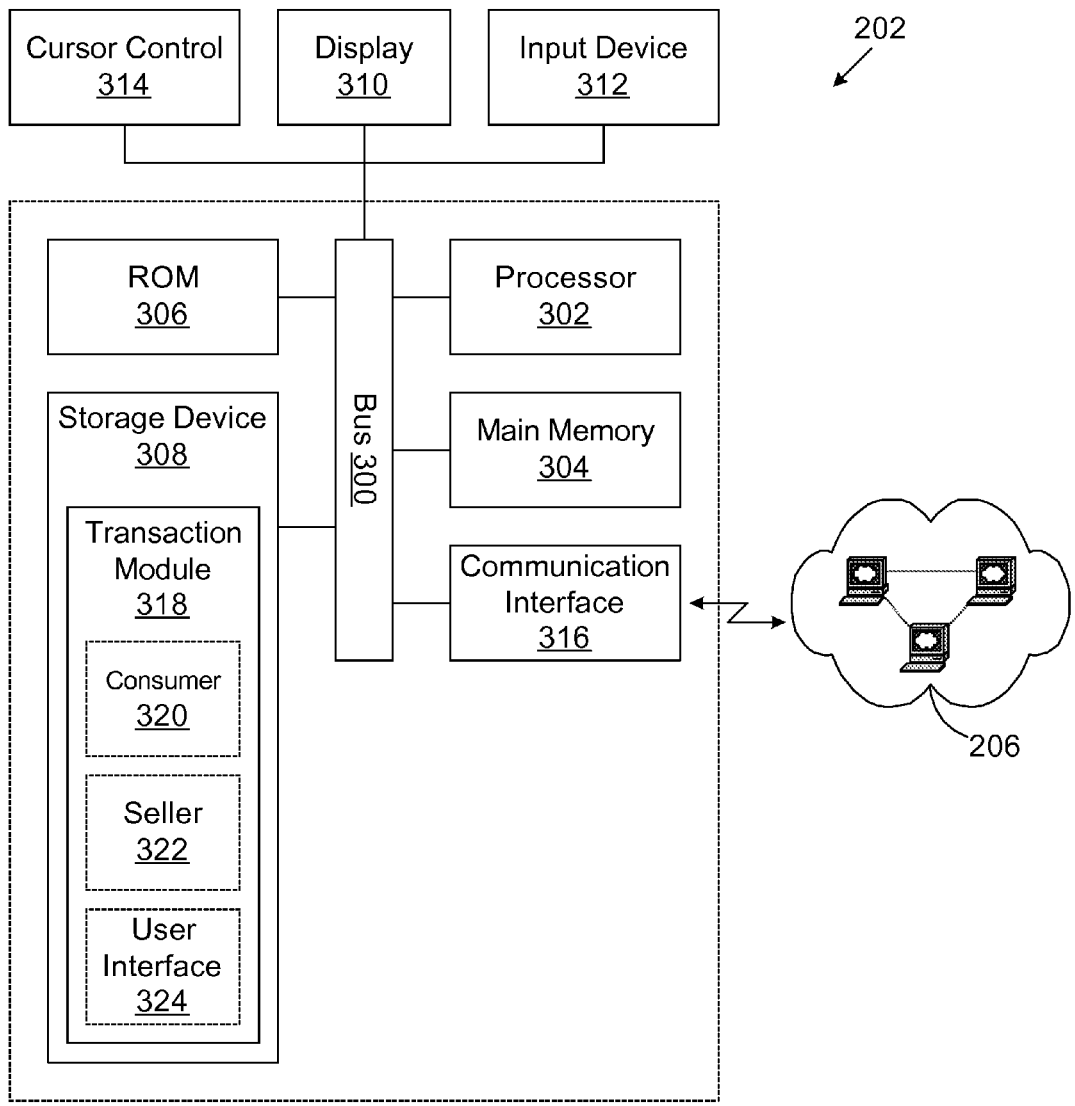
FIG. 3 illustrates an exemplary computing system for conducting a consumer transaction requiring a monetary loan.

FIG. 3 illustrates the lender computing system 202 in more detail. In one embodiment, the lender computing system 202 is a web server hosting a publicly-available website for the lending institution and the consumer accesses the website via a commercially available web browser running on the consumer computing system 204. In other embodiments, the lender computing system 202 may be a conventional application server hosting a proprietary online service accessible only via a private network. In any event, the lender computing system 202 typically has appropriate security mechanisms in place to prevent unauthorized third parties from intercepting the consumer's information.

In the implementation shown, the lender computing system 202 may include a bus 300 or other communication mechanism for communicating information and a processor 302 coupled to the bus 300 for processing information. The lender computing system 202 also includes a main memory 304, such as a random access memory (RAM) or other dynamic storage device, coupled to the bus 300 for storing computer-readable instructions to be executed by the processor 302. The main memory 304 also may be used for storing temporary variables or other intermediate information during execution of the instructions to be executed by the processor 302. The lender computing system 202 further includes a read-only memory (ROM) 306 or other static storage device coupled to the bus 300 for storing static information and instructions for the processor 302. A computer-readable storage device 308, such as a magnetic disk or optical disk, is coupled to the bus 300 for storing information and instructions for the processor 302.

The lender computing system 202 may be coupled via the bus 300 to a display 310, such as a cathode ray tube (CRT), for displaying information to a user. An input device 312, including, for example, alphanumeric and other keys, is coupled to the bus 300 for communicating information and command selections to the processor 302. Another type of user input device is a cursor control 314, such as a mouse, a trackball, or cursor-direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer readable instructions" as used above refers to any instructions that may be performed by the processor 302 and/or other component of the lender computing system 202. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 308. Volatile media include dynamic memory, such as the main memory 304. Transmission media include coaxial cables, copper wire and fiber optics, including wires of the bus 300. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the lender computing system 202 can receive the data on the telephone line and use an infrared transmitter to convert the data to an infrared signal. An infrared detector coupled to the bus 300 can receive the data carried in the infrared signal and place the data on the bus 300. The bus 300 carries the data to the main memory 304, from which the processor 302 retrieves and executes the instructions. The instructions received by the main memory 304 may optionally be stored on the storage device 308 either before or after execution by the processor 302.

The lender computing system 202 may also include a communication interface 316 coupled to the bus 300. The communication interface 316 provides a two-way data communication coupling between the lender computing system 202 and the network 206. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

In some embodiments, a transaction module 318 is installed on the lender computing system 202, for example, on the storage device 308. The transaction module 318 is designed to allow transactions of the type mentioned above to be conducted online, thus eliminating the need for physical documentations, such as "sight drafts" and other loan-related documents. In one embodiment, the transaction module 318 is composed of several components that are described here in terms of their functions, including a consumer component 320, a seller component 322, and a user interface 324. Indeed, the transaction module 318 itself may be only one of several service components (not expressly shown) running on the lender computing system 202, each component allowing a different service (e.g., insurance, loans, investment, etc.) to be provided by the lending institution online.

Briefly, the consumer component 320 functions to receive and process loan or financing applications from consumers, determine whether the consumers are eligible for a loan, notify the consumers of the loan terms, generate the loan documents embodying the loan terms, obtain the consumer's consent thereto, and create the unique lender transaction IDs. The seller component 322 is responsible for verifying the lender transaction IDs received from sellers, verifying the identity of the consumers, and forwarding the appropriate payments to the sellers. In some cases, the seller component 322 also ensures that the sellers are legitimate businesses before allowing them to use the transaction IDs. As for the user interface 324, this component generates the various graphical user interfaces used by the consumer component 320 and the seller component 322 to interact with the consumers and the sellers, respectively.

An exemplary implementation of the transaction module 318 as a web-based application (i.e., a website) is illustrated in FIGS. 4-15 via a plurality of web pages. Although not necessary, it is assumed throughout FIGS. 4-15 that the consumer is a member of, or has an account with, and is thus able to access account-specific web pages of the lending institution operating the transaction module 318. Also, the web pages of FIGS. 4-15 represent merely one possible web page design or layout generated by the user interface 324. Those having ordinary skill in the art will understand that numerous other designs or layouts may be used. Moreover, these web pages are illustrative only and are not intended to be exhaustive in content or number, nor do they represent a minimum required number of web pages or a particularly preferable sequence of web pages.

Figure 4:
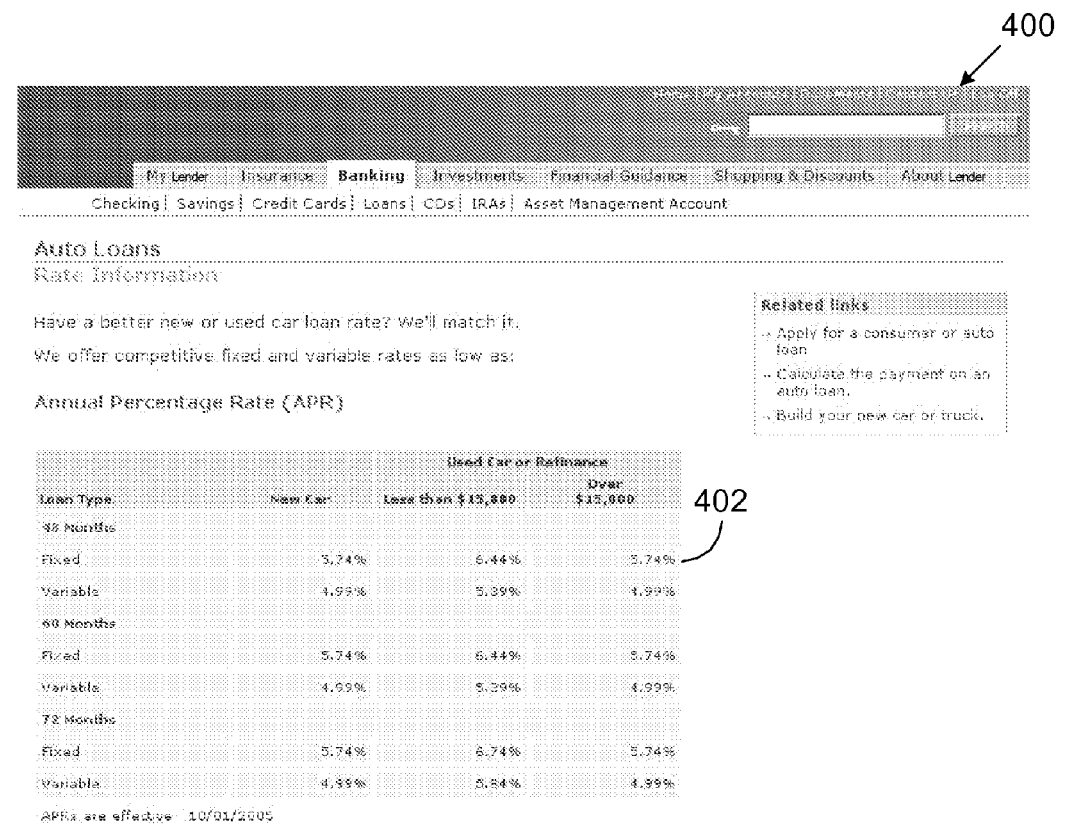

Referring to FIG. 4, an interest rate information web page 400 is shown that may be used by the consumer component 320 in one embodiment to inform a consumer of the various types of loans that are available. This web page 400 is typically displayed once the consumer has logged in to his/her account on the lender computing system 202 and has expressed an interest in obtaining a loan by selecting a "Banking" tab. The interest rate information web page 400 may include, among other things, an annual percentage rate (APR) table 402 that lists types of loans (e.g., fixed, variable, etc.), loan periods (e.g., 48 months, 60 months, 72 months, etc.), and interest rates that are available with each loan type and period.

Figure 5:
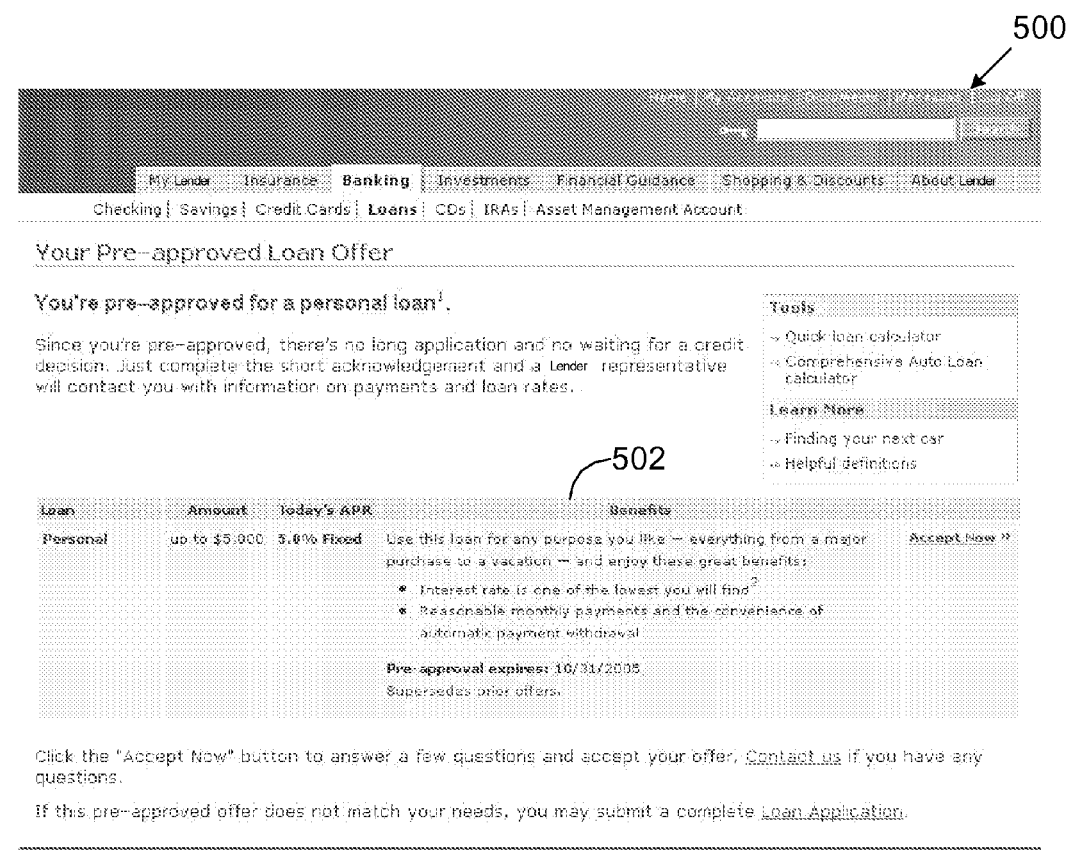

In some cases, the consumer may have previously received an offer from the lending institution for a pre-approved loan. FIG. 5 illustrates a pre-approved loan web page 500 that may be used by the consumer component 320 to notify the consumer of the pre-approved loan. This web page 500 may include, among other things, a table 502 that lists the type of loan (e.g., personal, automotive, etc.), the loan amount, and the interest rate that the consumer has been pre-approved for, along with various other pertinent information. The consumer may then accept the pre-approved loan or apply for a different loan by selecting the appropriate hyperlink on the web page.

Figure 6:
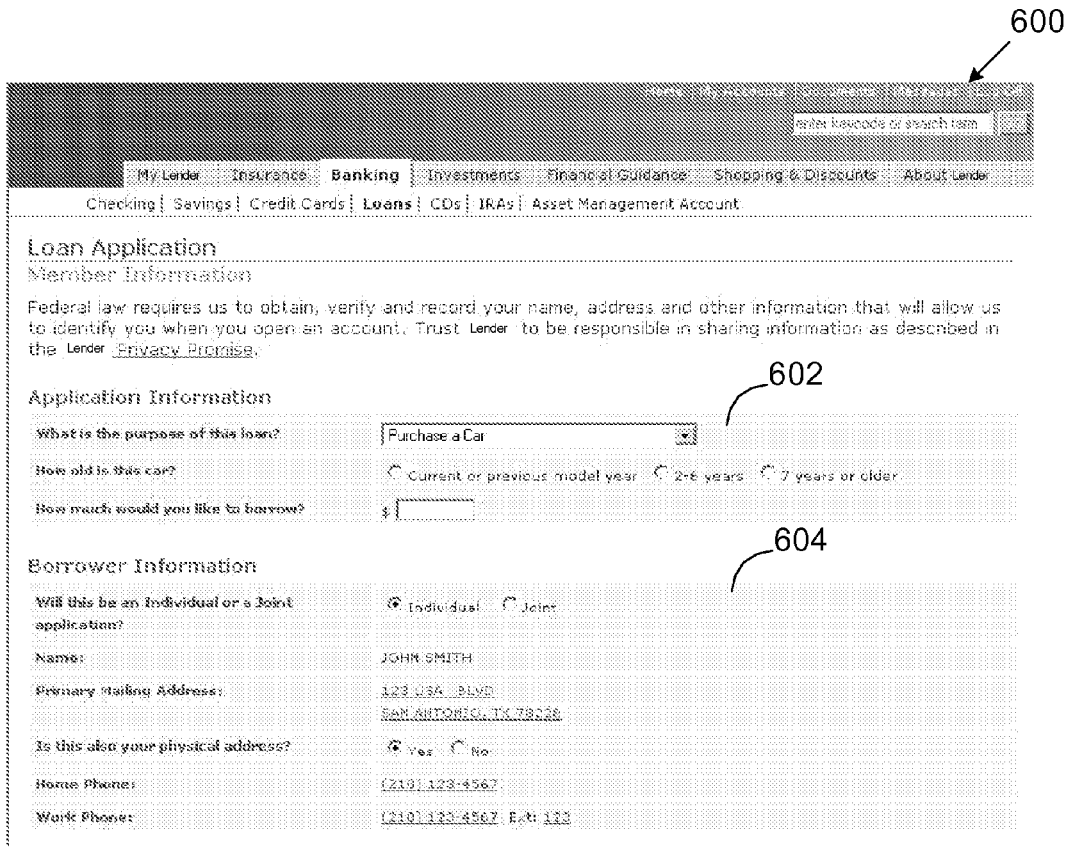

FIG. 6 illustrates a loan application web page 600 that may be used by the consumer component 320 when the consumer wishes to apply for a loan. This web page 600 may be one of several web pages (not expressly shown here) that together form a comprehensive loan application that may be used by the lending institution to obtain the information needed to process a loan. The loan application web page 600 may include, among other things, an application information table 602 for specifying the type of loan, the amount of the loan, and other pertinent information. In the present example, the consumer has selected an automotive loan and, therefore, the remaining web pages have been adapted for an automobile purchase. Also included is a borrower information table 604 for obtaining various personal and financial information about the consumer.

Figure 7:
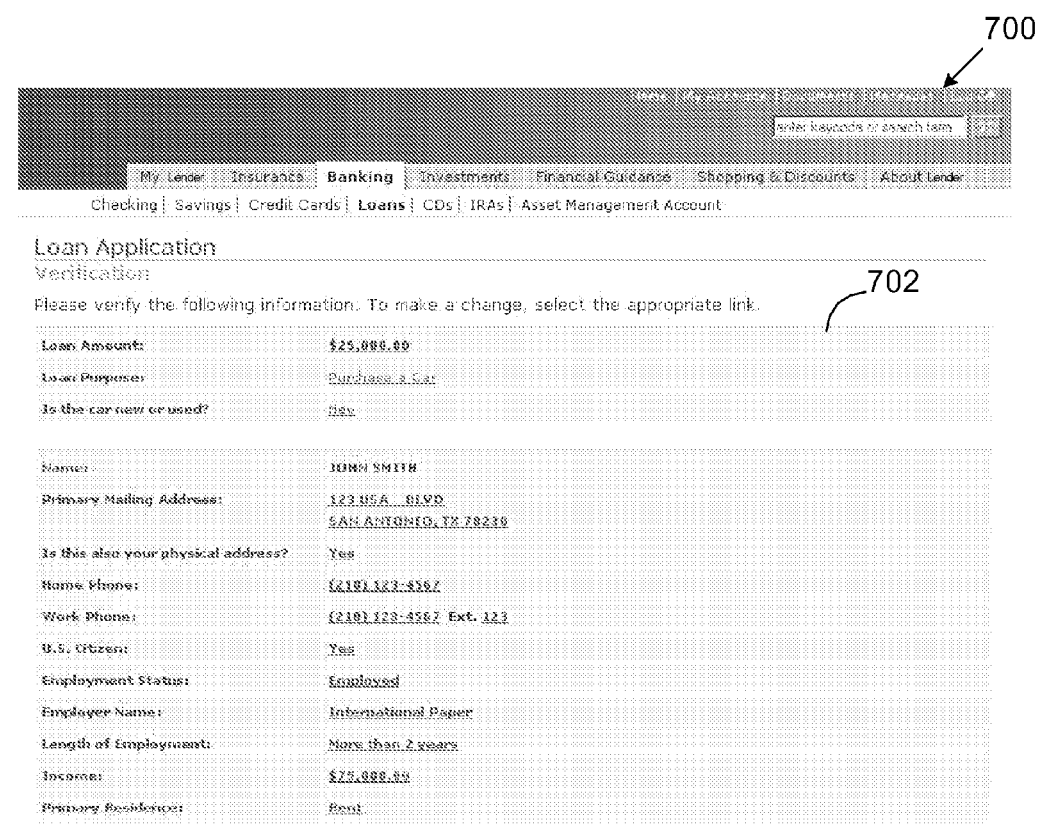

After the consumer has completed the comprehensive loan application, he/she may be asked by the consumer component 320 to verify the loan application information provided. FIG. 7 illustrates an exemplary verification web page 700 that may be used by the consumer component 320 to verify the loan application information. The verification web page 700 may include, among other things, an information summary table 702 that lists the various items of information provided by the consumer on the comprehensive loan application (see FIG. 6). The consumer may then verify the information or change the information as needed by selecting the appropriate hyperlink on the web page.

The consumer component 320 thereafter sends the information provided on the comprehensive loan application to one or more credit reporting bureaus and obtains a credit history report for the consumer. Based on the credit history report and the lending institution's internal lending policies, the consumer component 320 (or an operator using the consumer component 320) determines whether the consumer qualifies for the requested loan.

Figure 8:
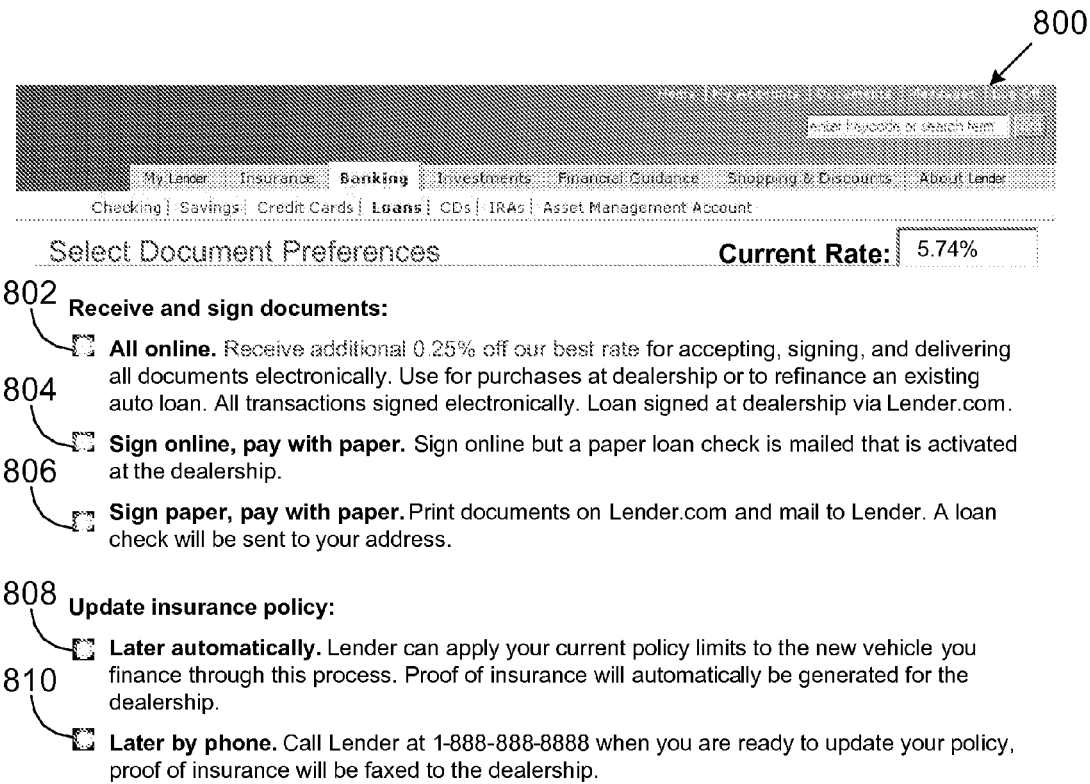

Assuming the consumer is eligible for the requested loan, he/she is given the option of choosing the type of loan documents to be used. FIG. 8 illustrates a document preference web page 800 that may be used by the consumer component 320 for allowing the consumer to select the types of loan documents. As can be seen from this web page 800, the consumer may choose to have all documents accepted, signed, and delivered electronically (option 802), all documents accepted, signed, and delivered by paper (option 804), or a combination of both (option 806). In some embodiments, a reduction in interest rate may be provided to the consumer as an incentive to select the electronic option.

In some embodiments, the consumer may have an existing automobile insurance policy with the lending institution. In that case, the document preference web page 800 may further include options for the consumer to update the automobile insurance policy. The update options may include, for example, an option to update the policy automatically (option 808), in which case proof of insurance will be generated electronically for the dealership. The update options may further include an option to update the policy by telephone (option 810), in which case the proof of insurance will be faxed to the dealership later.

Figure 9:
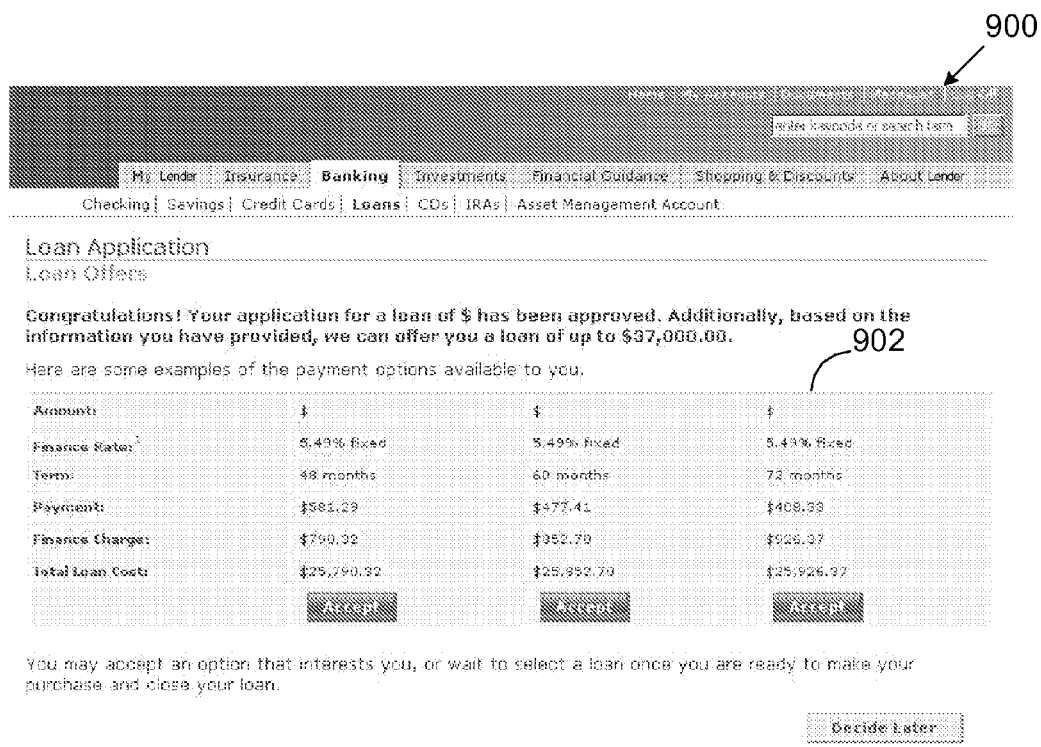

Once the document preferences have been selected and, if applicable, the automobile insurance policy update options chosen, the consumer component 320 notifies the consumer of the loan approval. This may be achieved via a congratulatory message, such as "Congratulations!" and the like, on a congratulatory web page 900, as illustrated in FIG. 9. In conjunction with the congratulatory message, the consumer component 320 may also use the congratulatory web page 900 to inform the consumer of any additional or maximum amount he/she may be eligible to borrow. To this end, the web page 900 may include, among other things, a table 902 listing the various possible loan terms for the additional or maximum amount.

Figure 10A:
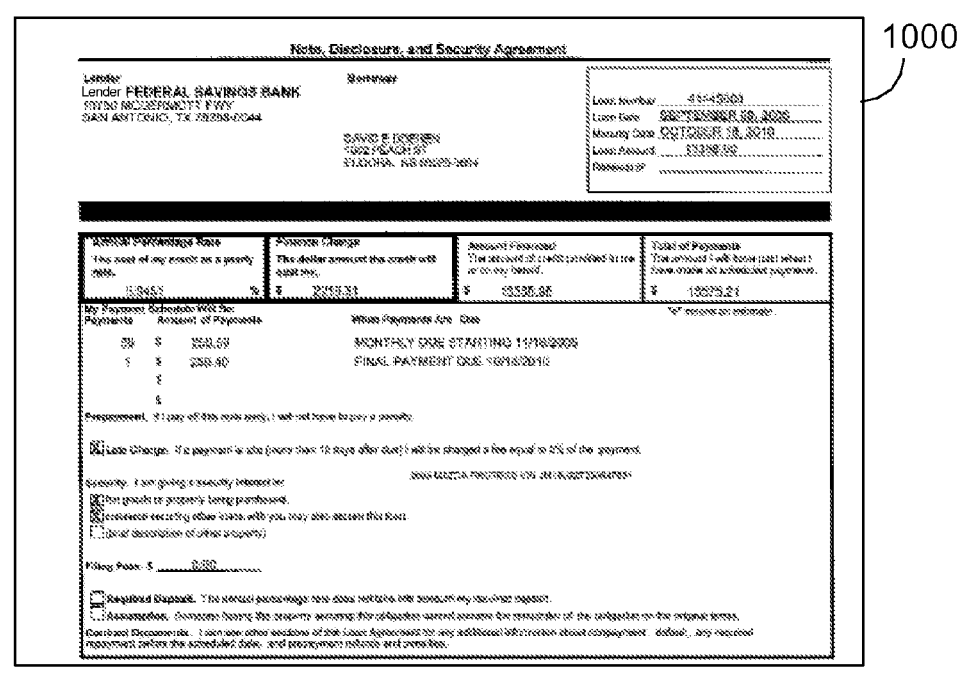

FIG. 10A illustrates a web-based or online note, disclosure, and security agreement 1000 generated by the consumer component 320 for securing the loan. The note, disclosure, and security agreement 1000 specifies the terms of the loan and, when executed, grants to the lending institution a security interest in the automobile to be purchased. This web-based agreement is made available online when the consumer has selected the electronic option (See, e.g., FIG. 8). Any standardized agreement or even a non-standardized (i.e., customized) agreement acceptable to the lending institution may be employed for the note, disclosure, and security agreement 1000. The consumer component 320 generates this note, disclosure, and security agreement 1000 using a template of the standardized (or customized) agreement. More specifically, the consumer component 320 combines or merges the information provided by the consumer and the various loan terms into the template.

Figure 10B:
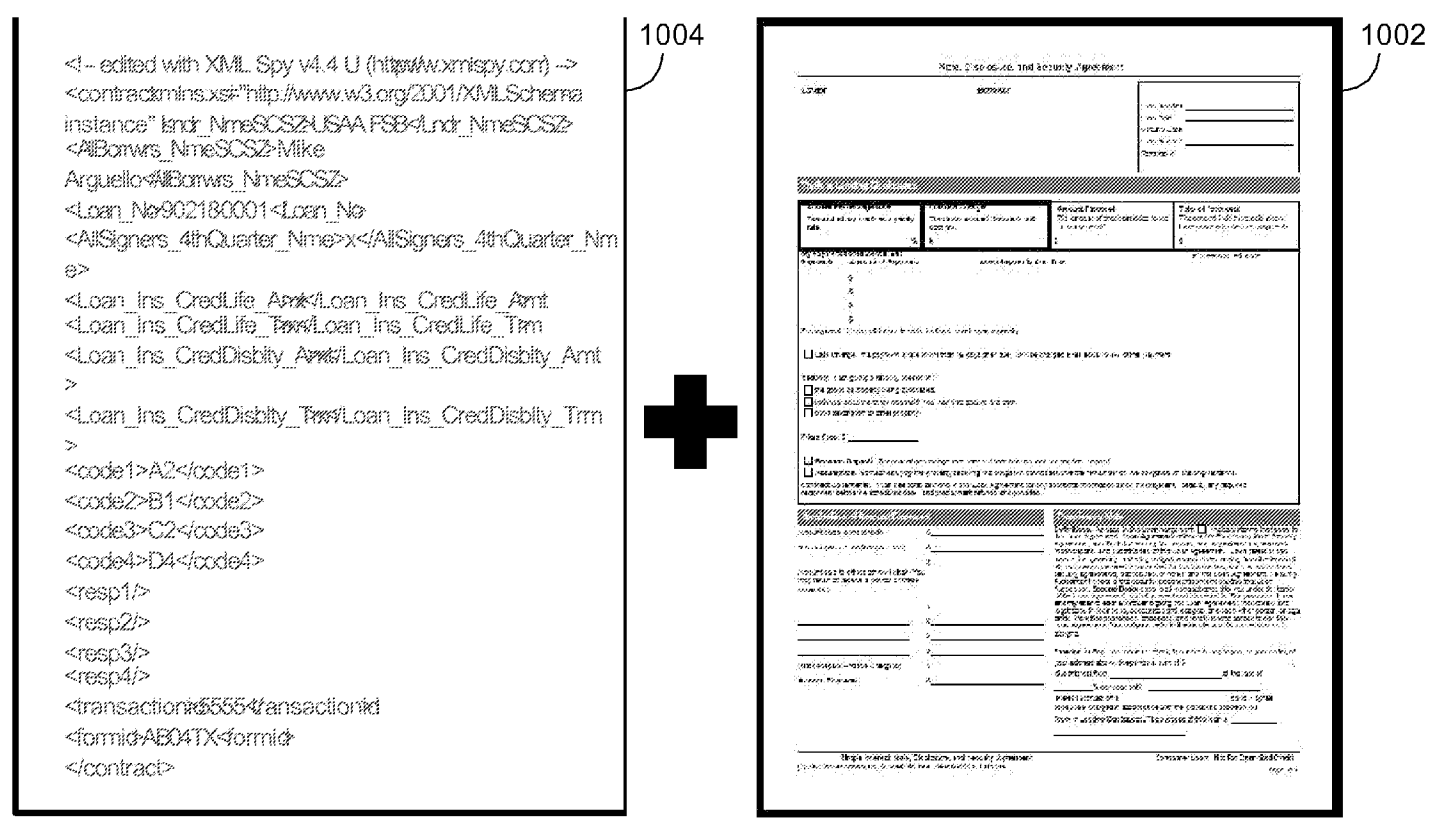

FIG. 10B illustrates an example of a template, indicated at 1002, that may be used by the consumer component 320 to generate the note, disclosure, aid security agreement 1000.

Also shown are the consumer information and loan terms as captured and stored, for example, in one or more data files 1004 (e.g., an XML file). Note that the security agreement 1000 in FIG. 10A has the necessary consumer information and loan terms filled in, whereas the exemplary template 1002 is simply a blank form. Such a template 1002 may be created from the standardized (or customized) agreement using one of several commercially available software tools, such as Adobe® LiveCycle FormServer, and the like. These software tools typically produce files that have one of several popular portable document formats, including a PDF format, a TIFF format, and the like.

In some embodiments, a built-in quality control (QC) function may also be provided to ensure accuracy of the contents of the note, disclosure, and security agreement 1000. The QC function prevents certain applicants from being inadvertently given loan terms (e.g., dollar amount, duration, interest rate, etc.) for which they are economically ineligible. Such a QC function may be based, for example, on a predefined set of rules, entries in a lookup table, and the like.

In accordance with the disclosed embodiments, the template 1002 contains substantially the same content (e.g., provisions, conditions, disclaimers, etc.) as the original standardized (or customized) agreement. This should eliminate or otherwise minimize any concerns that may arise as to the validity or legality of the resulting note, disclosure, and security agreement 1000. In some embodiments, the template 1002 also has substantially the same layout and design (e.g., font, paper size, margins, etc.) as the original standardized (or customized) agreement. The consumer component 320 then inserts into this template 1002 the consumer information and loan terms captured in the one or more data files 1004 to generate the note, disclosure, and security agreement 1000 shown in FIG. 10A. Software tools for performing such insertions are well known to those having ordinary skill in the art and include the same Adobe® LiveCycle FormServer tool mentioned above.

Either shortly thereafter or the next time the consumer accesses his/her account-specific web pages, the consumer component 320 requests that the consumer manifests his/her consent or acceptance of the loan by signing the note, disclosure, and security agreement 1000. In accordance with various embodiments, the consumer component 320 provides the consumer with an electronic signature block instead of having the consumer physically sign the security agreement 1000. Any physical or actual signature blocks, to the extent they are present on the note, disclosure, and security agreement 1000, are left unsigned. The electronic signature block provided by the consumer component 320 is a generic electronic signature block, meaning that it may be used for any agreement and is not tied to any particular agreement. In addition, the electronic signature block is modular, which means that a separate electronic signature block may be applied to each one of several agreements, or a single electronic signature block may be applied to several related agreements. Furthermore, the electronic signature block is non-invasive, which means it does not alter or modify the content of the security agreement 1000 in any way.

Figure 10C:
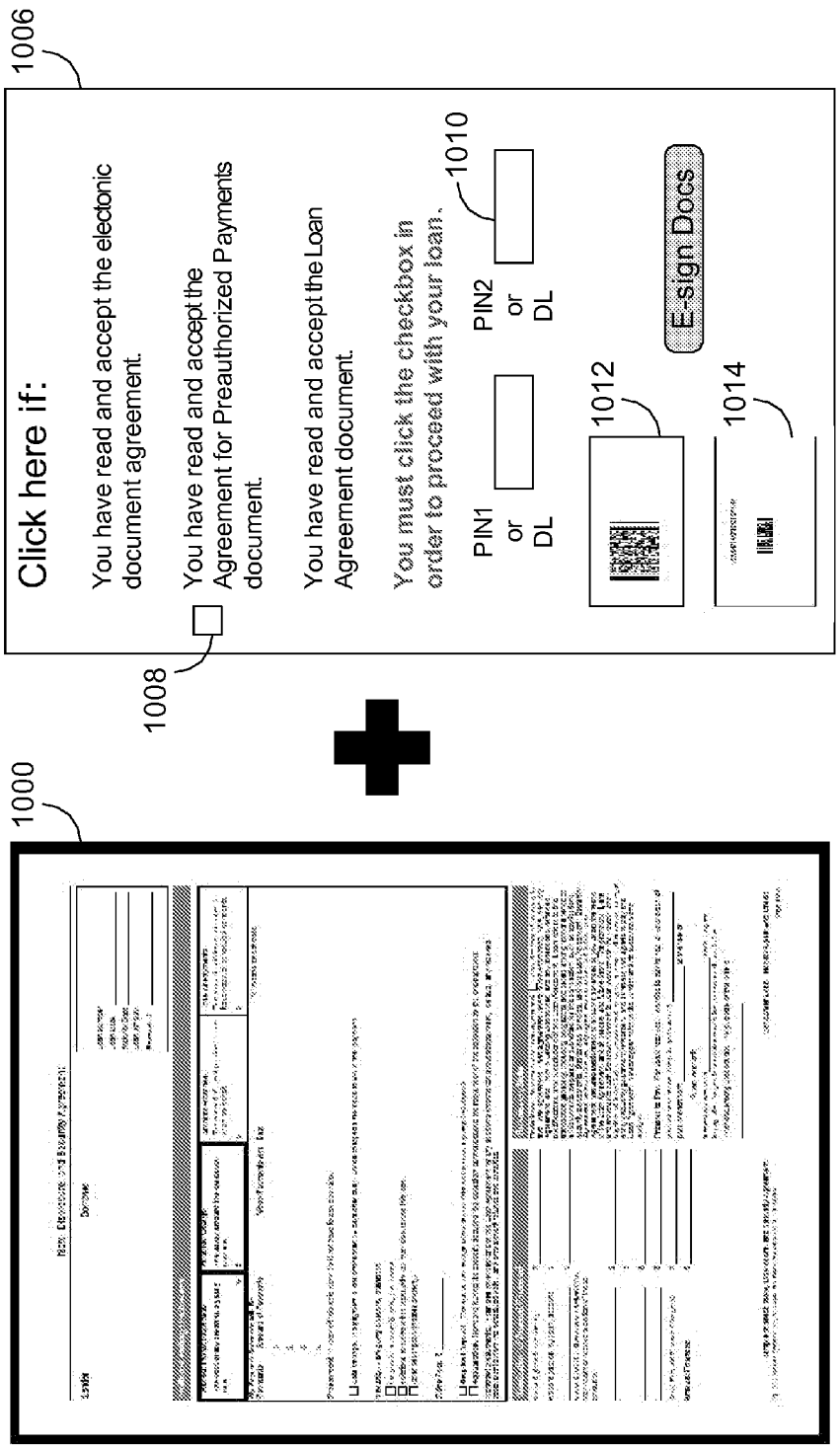

An example of a modular electronic signature block is illustrated at 1006 in FIG. 10C. As can be seen, instead of a blank signature line for a handwritten signature, the modular electronic signature block 1006 includes a check box 1008 and one or more electronic signature fields 1010 for allowing the consumer (or co-consumers) to click and enter an electronic signature. Such an electronic signature may be composed of alpha and/or numeric characters, for example, a driver's license (DL) number or other personal identification number (PIN). The PIN is preferably preselected by the consumer component 320 and delivered separately to the consumer, for example, by email, facsimile, telephone, or some other secure delivery method. The consumer may then electronically sign the electronic signature block by entering the PIN in the electronic signature field 1010, thereby manifesting his/her consent to the loan terms in the security agreement 1000. In some embodiments, it is also possible to allow the consumer to select his/her own PIN in advance, in which case, the consumer simply chooses a PIN and enters it into the electronic signature field 1010 (i.e., no separate secure delivery of the PIN is needed). In either case, once the PIN is entered, the consumer component 320 locks or otherwise deactivates the electronic signature block 1006 so that no further entries may be made to the modular electronic signature block.

In some embodiments, after the PIN is entered, a PIN authentication code is created using the PIN, and the PIN itself is then discarded. Such a PIN authentication code is illustrated at 1012 as barcodes that, in some embodiments, may be generated in real time while the consumer is entering the PIN. Thereafter, only the PIN authentication code 1012 is used whenever the electronic signature needs to be authenticated. Thus, someone wishing to forge the consumer's electronic signature (e.g., where the consumer has more than one valid PIN) must know both the PIN as well as the encryption algorithm used to create the PIN authentication code 1012 in order to reproduce the consumer's electronic signature.

An example of an encryption algorithm that may be used to generate the PIN authentication code 1012 is a "hash" function. A hash function converts plain text (i.e., the PIN) into a fixed-length string of numbers and/or characters. This string serves as a unique "digital fingerprint" for the plain text so that if the plain text is altered, a subsequent hash produces a different string. A key feature of hash functions is that they are one-way, meaning that it is very difficult or impossible to work backwards from the string to recreate the plain text. Examples of commonly-used hash functions include "MD5" and "SHA-1." Other types of encryption schemes known to those having ordinary skill in the art may also be used to create the PIN authentication code 1012.

In some embodiments, a document authentication code may be created using one or more of the consumer information and loan terms contained in the note, disclosure, and security agreement 1000. Such a document authentication code is illustrated at 1014 as barcodes and may be generated using the same hash function used to create the PIN authentication code 1012 above, or it may be created using some other encryption scheme. The document authentication code 1014 may thereafter be used to authenticate the note, disclosure, and security agreement 1000 should the consumer information or loan terms in the agreement be challenged. Any change to the consumer information or loan terms would result in a different document authentication code 1014 and would therefore be immediately detected.

The foregoing procedure is referred to as two-factor authentication, the first factor being authentication of the consumer's electronic signature and the second factor being authentication of the consumer information and loan terms on the electronically-signed agreement. Such a procedure allows both sets of information to be positively and definitively authenticated, thus providing greater security, integrity, and protection for the consumer as well as the lending institution than either factor alone.

Figure 11:
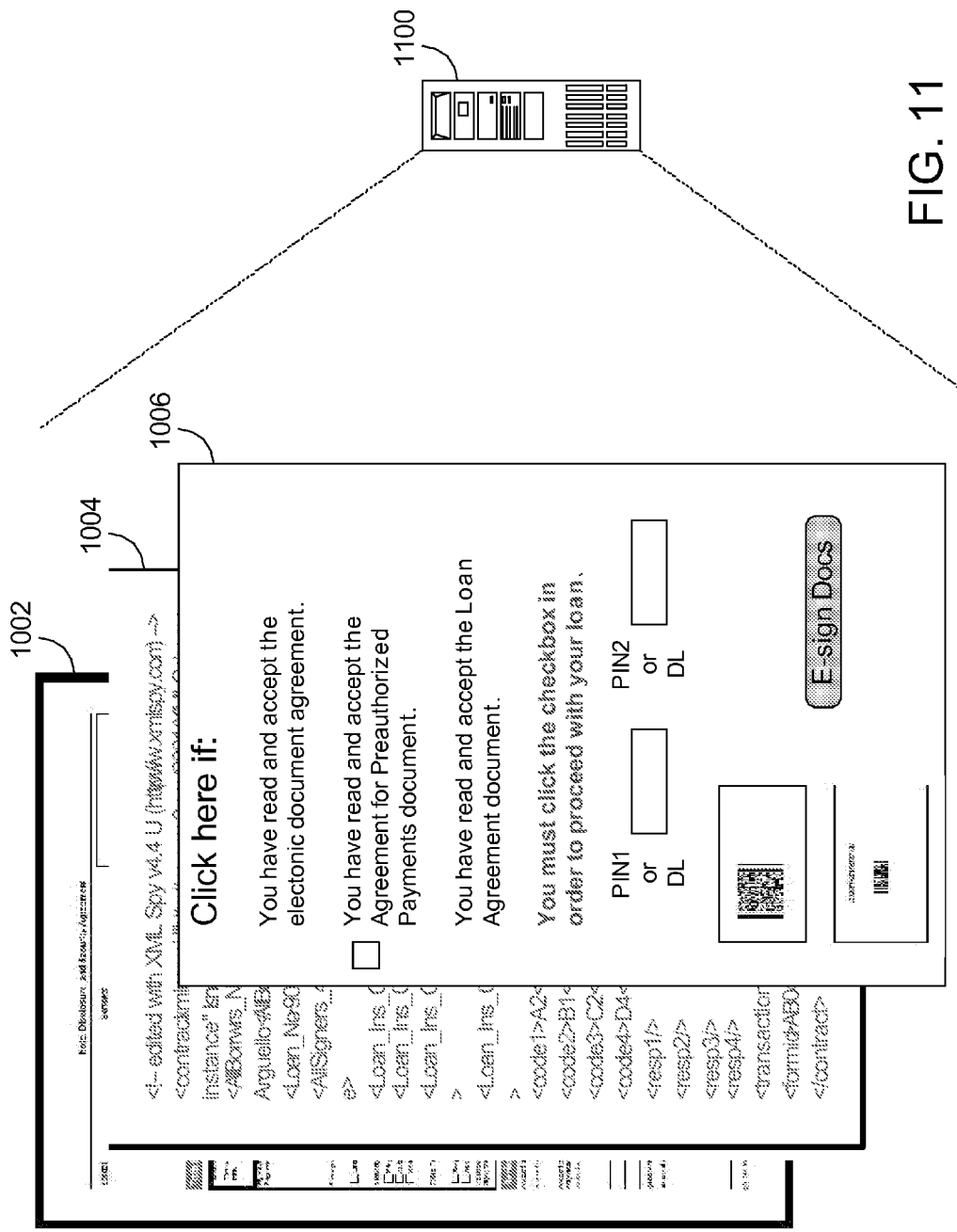

After the consumer electronically signs the security agreement 1000, the consumer component 320 stores the signed security agreement 1000 in an electronic vault 1100 (e.g., a server), as illustrated in FIG. 11. Because the security agreement 1000 is electronically signed, in some embodiments, instead of storing, for example, an optical scan of the security agreement 1000, the consumer component 320 stores the one or more data files 1004 and a template 1002 used to create the security agreement 1000 along with PIN authentication codes 1012 and document authentication codes 1014 for the security agreement 1000 and the specific encryption algorithm used. These items alone are sufficient to reproduce an exact copy of the security agreement 1000 for authentication purposes. In some embodiments, instead of storing the actual template 1002, the consumer component 320 may store only a reference to the template 1002 (e.g., the template name).

Figure 12:
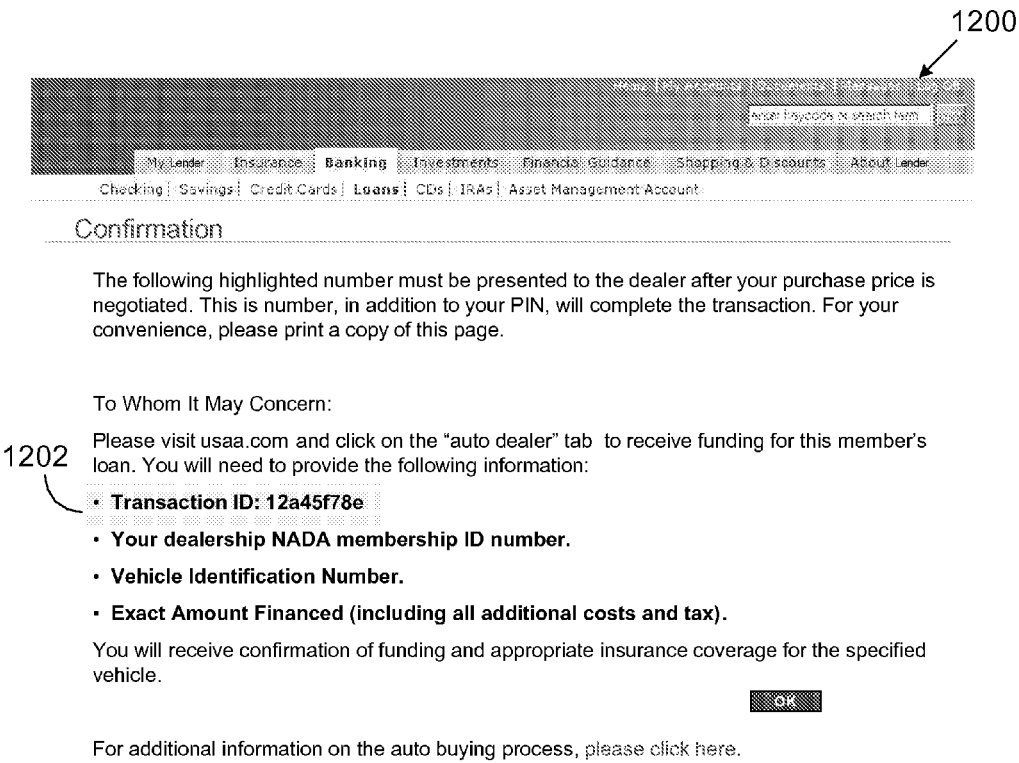

FIG. 12 illustrates a confirmation web page 1200 that may be used by the consumer component 320 to confirm the loan. The confirmation web page 1200 provides the consumer with a lender transaction ID 1202. As explained above, the lender transaction ID is generated by the consumer component 320 and confirms to the dealership that a loan of an appropriate amount has been guaranteed or otherwise provided to the consumer. In this regard, the lender transaction ID functions in much the same way as the "sight draft" mentioned previously, but without the complications and delays associated with the "sight draft." The lender transaction ID allows the dealership to treat the transaction as a cash transaction for all intents and purposes.

Any dealership may use the lender transaction ID 1202 because its usage does not require an account to be established with the lending institution. This eliminates the need for the lending institution to maintain an account profile (e.g., username, password, etc.) for each dealership and likewise eliminates the same need for the dealership with respect to the lending institution. In one sense, the lending institution relies on the consumer to authenticate the dealership (it is presumed the consumer would not reveal the transaction ID 1202 to an illegitimate dealership). In some embodiments, however, in addition to the consumer authentication, the lending institution may still require the dealership to satisfy some showing of legitimacy. Use of the transaction ID 1202 in one exemplary embodiment is explained below with respect to FIGS. 13-15.

Figure 13:
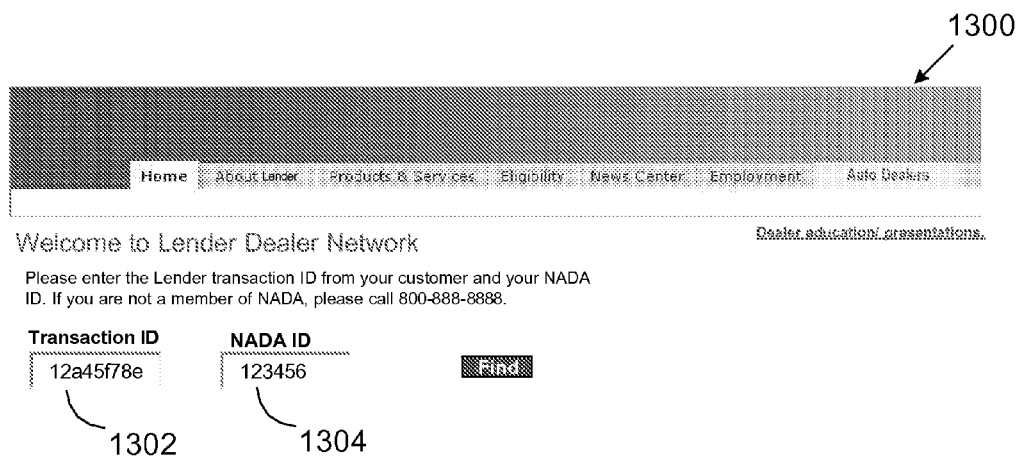
Figure 14:
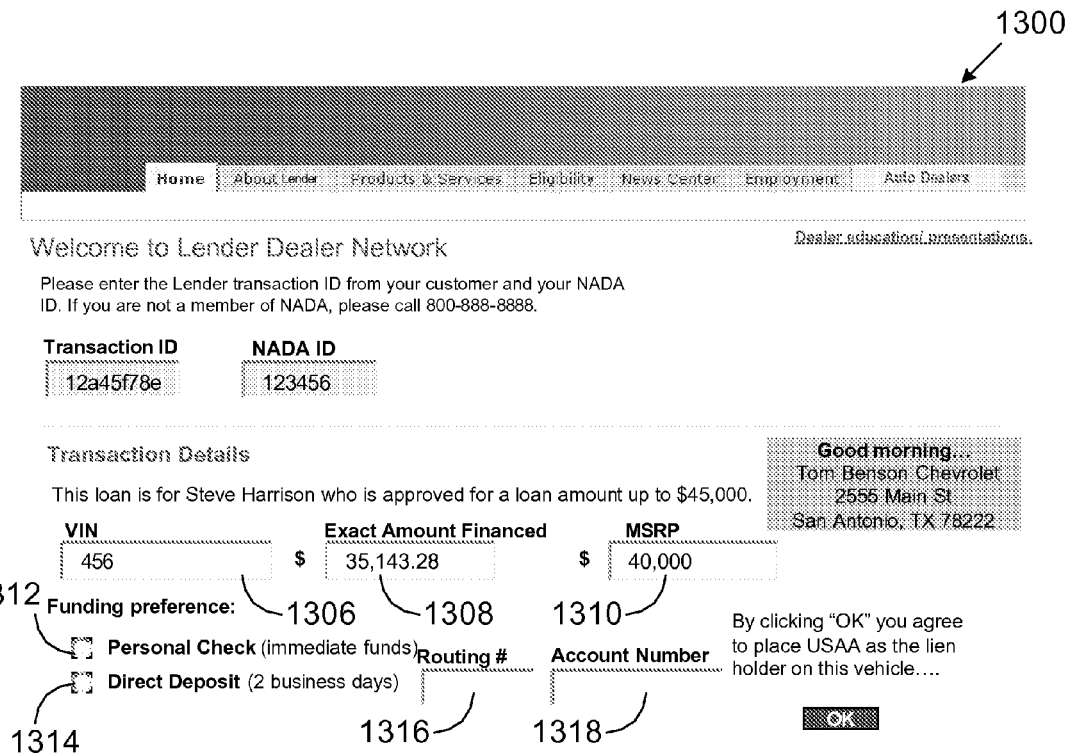

Thus far, the description has focused mainly on the consumer component 320 of the transaction module 318. FIGS. 13-15 illustrate exemplary web pages that may be used by the seller component 322 to interact, for example, with dealerships. Referring to FIG. 13, a dealership web page 1300 is shown that may be used by the seller component 322 to interact with a dealership. This web page 1300 may be displayed when the dealership accesses the lender computing system 202 to complete the transaction (i.e., after the consumer and the dealership have agreed on a purchase price for the contemplated purchase and the consumer has disclosed the lender transaction ID to the dealership). The dealership web page 1300 may include, among other things, a transaction ID field 1302 for the dealership to enter the lender transaction ID. In some embodiments, the dealership web page 1300 may also include a National Automobile Dealership Association (NADA) identification field 1304 for entering the dealership's NADA identification. The NADA identification may then be used to verify that the dealership is a legitimate automobile dealer before any payment is made to that dealership. In some embodiments, various incentives, such as listing on the lending institution's list of preferred dealerships, may be provided to the dealership to become a member of NADA or other similar organizations.

After the lender transaction ID and the NADA ID have been entered and confirmed by the seller component 322, the dealership web page 1300 may request that the dealership enter various information related to the transaction details. This is illustrated in FIG. 14 where a number of transaction detail fields have been added to the web page 1300. The transaction detail fields may include, for example, a VIN field 1306, a purchase price field 1308, and a manufacturer suggested retail price (MSRP) field 1310. The web page 1300 may also give the dealership a number of options regarding funding, including by cashier's check (option 1312) or by direct deposit (option 1314). Choosing the direct deposit option requires the dealership to enter the appropriate depositing information on the web page 1300, including the dealership's bank routing number (field 1316) and bank account number (field 1318).

Once the above information has been entered and verified, the final step to completing the transaction and obtaining payment for the dealership is for the consumer to verify his/her identity to the seller component 322 by providing his/her PIN. This step is illustrated in FIG. 15, where a member authorization field 1320 has been added to the web page 1300 for the consumer to enter his/her PIN (see FIGS. 10A-10C). The PIN must then be determined to be valid by the seller component 322 before the transaction is allowed to proceed. If the PIN is found to be valid, the seller component 322 instructs the lending institution to send to the dealership funds equal to the purchase price specified by the dealership via the funding option selected (e.g., cashier's check, direct deposit, etc.).

Figure 16:
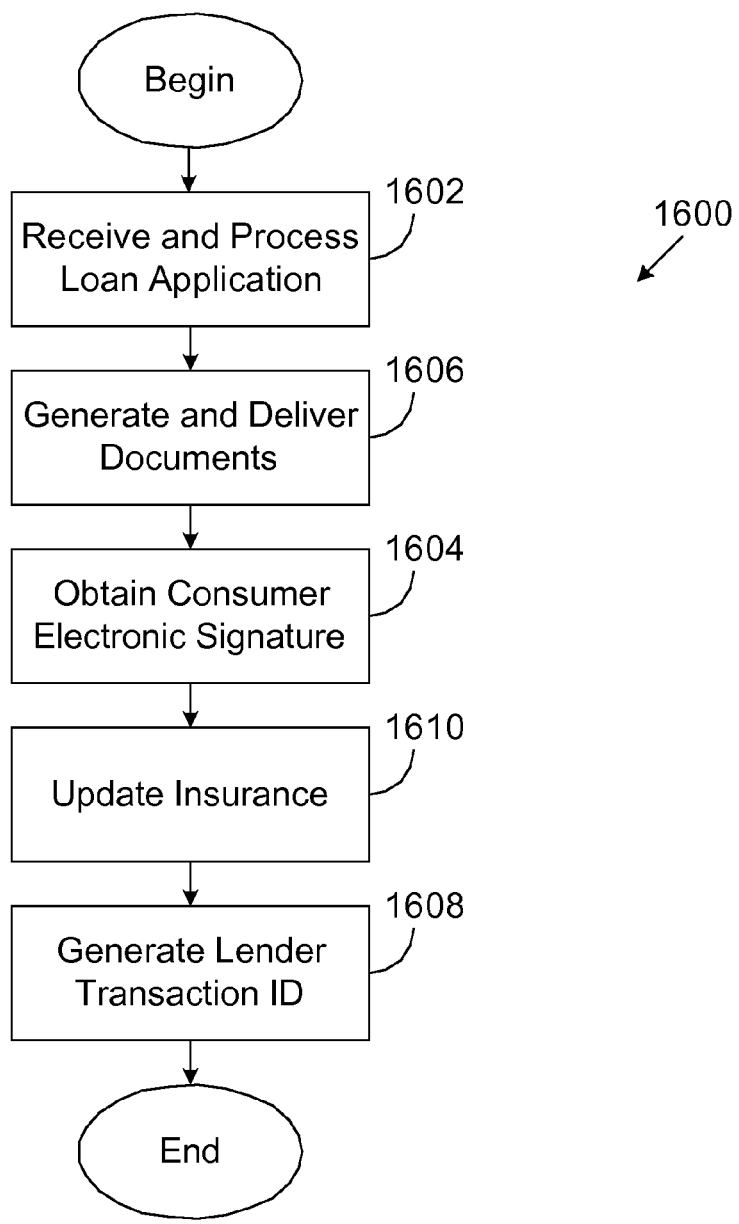
FIG. 16 illustrates a portion of a method for conducting a consumer transaction requiring a monetary loan.
Figure 17:
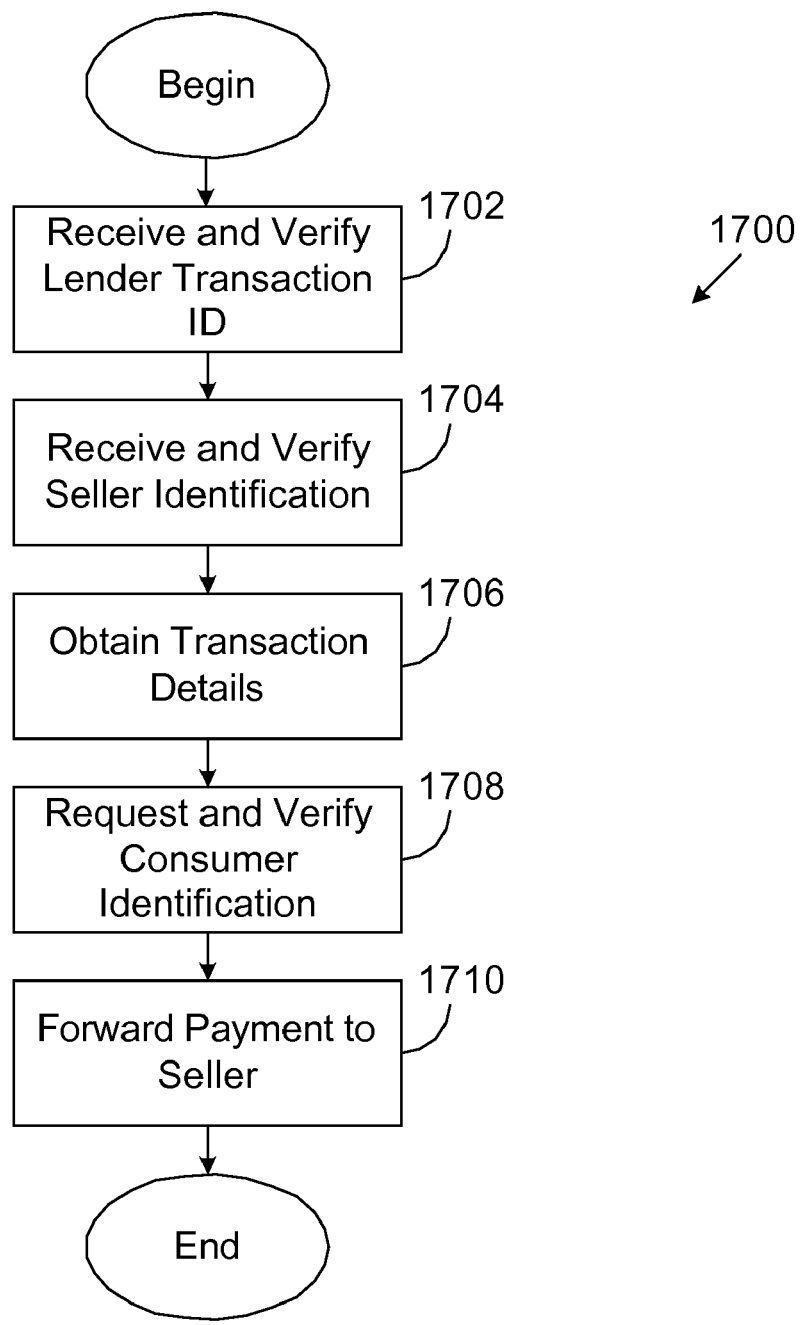
FIG. 17 illustrates another portion of a method for conducting a consumer transaction requiring a monetary loan.

The foregoing embodiments and various implementations and manifestations thereof may be summarized in one or more flowcharts, as shown in FIGS. 16 and 17. It should be noted that although the flow charts show a number of discrete steps, those having ordinary skill in the art will recognize that two or more steps may be combined into a single step, and an individual step may be divided into several component steps.

FIG. 16 illustrates a flowchart 1600 for a portion of a method that may be used by a lending institution to allow transactions of the type discussed herein to be conducted online. The method begins at step 1602, where the lending institution receives and processes loan applications online from consumers via a lender computing system. If a consumer is determined to be eligible for a monetary loan, the lending institution notifies the consumer of the loan terms via the lender computing system and obtains consumer acceptance of the loan terms at step 1604. In some embodiments, the consumer acceptance of the loan terms may be obtained via a modular electronic signature block, as discussed above. Where the consumer has an existing insurance policy with the lending institution, it is also possible to update the insurance policy to include the item to be purchased at step 1606, thus allowing proof of insurance to be established more quickly. At step 1608, the consumer is asked to provide the lending institution with a PIN for subsequent identification verification purposes, and at step 1610, the lending institution generates a lender transaction ID that may be used by a seller to complete the transaction and obtain payment.

FIG. 17 illustrates a flowchart 1700 for another portion of a method that may be used by a lending institution to allow transactions of the type discussed herein to be conducted online. The method begins at step 1702, where the lending institution receives and verifies a lender transaction ID online from a seller via a lender computing system. The seller typically receives the lender transaction ID from the consumer after the consumer and the seller have agreed on a purchase price for the item to be purchased. In some embodiments, the lending institution may also receive and verify the seller identification online at step 1704 to determine whether the seller is a legitimate business. Assuming that the lender transaction ID is determined to be valid (and that the seller is a legitimate seller), the lending institution requests the seller to provide various details regarding the transaction at step 1706, such as the purchase price, VIN, and MSRP (where the item to be purchased is an automobile). At step 1708, the lending institution requests and verifies the PIN previously selected by the consumer in order to authenticate the identity of the consumer. If the PIN is valid, the lending institution forwards the appropriate payment to the seller via the payment option (e.g., cashier's check, direct deposit, etc.) selected by the seller.

While the detailed description has been described with reference to one or more particular embodiments, those skilled in the art will recognize that many changes may be made thereto without departing from the spirit and scope of the description. For example, although the detailed description has been described in the context of an automobile purchase, the disclosed embodiments may be equally applicable to any transaction where a loan or financing is required, including the purchase of a home, a business, and the like. Moreover, although the detailed description has been illustrated herein by way of several exemplary web pages, other electronic transmission means may also be used. For example, in addition to (or instead of) web pages, information may also be transmitted by email from/to the consumer to/from the lending institution and the seller. Similarly, although the manipulation of standardized forms is illustrated with the PDF file format, the same concept can be applied to any file format. Therefore, each of the foregoing embodiments and obvious variations thereof is contemplated as falling within the scope of the claimed subject matter, which is set forth in the following claims.

What is claimed is:

1. A method of facilitating a commercial transaction requiring financing by a lending institution, the method comprising:
   utilizing a memory and one or more processors in a number of computing apparatuses, wherein the one or more processors execute program instructions stored in the memory to perform the method for;
   receiving, by at least one of the number of computing apparatuses, financing application information via a network from a consumer involved in said commercial transaction, said financing application information including information required to determine whether said consumer is eligible for said financing;
   determining, by at least one of the number of computing apparatuses, whether said consumer is eligible for said financing based on said financing application information;
   presenting, by at least one of the number of computing apparatuses, a financing agreement to said consumer over said network, said financing agreement having a physical signature block and a modular electronic signature block appended thereto, where said modular electronic signature block is applicable to a plurality of agreements;
   obtaining, by at least one of the number of computing apparatuses, an electronic signature from said consumer for said financing agreement via said modular electronic signature block, wherein said electronic signature is a personal identification number that locks said modular electronic signature block so that no further entries may be made to said modular electronic signature block;
   providing, by at least one of the number of computing apparatuses, a personal identification number authentication code that replaces said personal identification number as authentication for said electronic signature, wherein said personal identification number authentication code is generated simultaneously with obtaining said personal identification number from said consumer;
   discarding, by at least one of the number of computing apparatuses, said personal identification number after generation of said personal identification number authentication code and using said personal identification number authentication code when said electronic signature authentication is needed;
   maintaining one or more data files related to the financing agreement and a reference to a template used to create the financing agreement along with the personal identification number authentication code, a document authentication code for the financing agreement, and a specific encryption algorithm used;
   reproducing a copy of the financial agreement from the maintained data files, template reference, personal identification number authentication code, document authentication code for the financing agreement, and specific encryption algorithm;
   generating, by at least one of the number of computing apparatuses, a unique transaction identification for said financing in response to determining that said consumer is eligible for said financing; and
   electronically, by at least one of the number of computing apparatuses, providing said unique transaction identification to said consumer via said network.

2. The method according to claim 1, wherein said modular electronic signature block is non-invasive, such that said generic modular electronic signature block does not modify a content of the plurality of agreements.

3. The method according to claim 1, wherein said financing agreement includes a plurality of sub-agreements, further comprising appending said modular electronic signature block to each of the plurality of sub-agreements.

4. The method according to claim 1, wherein said personal identification number (PIN) is previously provided to said consumer and said obtaining comprises entry by said consumer of said PIN in said modular electronic signature block.

5. The method according to claim 1, further comprising generating, by at least one of the number of computing apparatuses, said authentication code for said consumer.

6. The method according to claim 1, further comprising generating, by at least one of the number of computing apparatuses, the document authentication code for said financing agreement from consumer information and financing terms in the financing agreement.

7. The method according to claim 1, wherein said commercial transaction comprises an automobile purchase.

8. A system of facilitating a commercial transaction requiring financing by a lending institution, the system comprising at least one subsystem having a computing device with a processor and memory for storing executable instructions that are executable by the processor, wherein the processor is configured to:
   receive financing application information via a network from a consumer involved in said commercial transaction, said financing application information including information required to determine whether said consumer is eligible for said financing;
   determine whether said consumer is eligible for said financing based on said financing application information;
   present a financing agreement to said consumer over said network, said financing agreement having a physical signature block and a modular electronic signature block appended thereto, where said modular electronic signature block is applicable to a plurality of agreements;

obtain an electronic signature from said consumer for said financing agreement via said modular electronic signature block, wherein said electronic signature is a personal identification number that locks said modular electronic signature block so that no further entries may be made to said modular electronic signature block;

provide a personal identification number authentication code that replaces said personal identification number as authentication for said electronic signature, wherein said personal identification number authentication code is generated simultaneously with obtaining said personal identification number from said consumer;

discard said personal identification number after generation of said personal identification number authentication code and use said personal identification number authentication code when said electronic signature authentication is needed;

maintain one or more data files related to the financing agreement and a reference to a template used to create the financing agreement along with the personal identification number authentication code, a document authentication code for the financing agreement, and a specific encryption algorithm used;

reproduce a copy of the financial agreement from the maintained data files, template reference, personal identification number authentication code, document authentication code for the financing agreement, and specific encryption algorithm;

generate a unique transaction identification for said financing in response to determining that said consumer is eligible for said financing; and electronically provide said unique transaction identification to said consumer via said network.

9. The system according to claim 8, wherein said modular electronic signature block is non-invasive, such that said generic modular electronic signature block does not modify a content of the plurality of agreements.

10. The system according to claim 8, wherein said financing agreement includes a plurality of sub-agreements, and further including instructions that are executable by the processor to append said modular electronic signature block to each of the plurality of sub-agreements.

11. The system according to claim 8, wherein said personal identification number (PIN) is previously provided to said consumer and further including instructions that are executable by the processor to obtain said electronic signature comprises at least one subsystem configured to receive said PIN from said consumer in said modular electronic signature block.

12. The system according to claim 8, further including instructions that are executable by the processor to generate said authentication code for said consumer.

13. The system according to claim 8, further including instructions that are executable by the processor to generate the document authentication code for said financing agreement from consumer information and financing terms in the financing agreement.

14. The system according to claim 8, wherein said commercial transaction comprises an automobile purchase.

15. A non-transitory computer-readable medium comprising computer-readable instructions for facilitating a commercial transaction requiring financing by a lending institution, the computer-readable instructions comprising instructions for:

receiving financing application information via a network from a consumer involved in said commercial transaction, said financing application information including information required to determine whether said consumer is eligible for said financing;

determining whether said consumer is eligible for said financing based on said financing application information;

presenting a financing agreement to said consumer over said network, said financing agreement having a physical signature block and a modular electronic signature block appended thereto, where said modular electronic signature block is applicable to a plurality of related agreements;

at least one of a predefined set of rules or a number of entries in a lookup table;

obtaining an electronic signature from said consumer for said financing agreement via said modular electronic signature block, wherein said electronic signature is a personal identification number that locks said modular electronic signature block so that no further entries may be made to said modular electronic signature block;

providing a personal identification number authentication code that replaces said personal identification number as s authentication for said electronic signature, wherein said personal identification number authentication code is generated simultaneously with obtaining said personal identification number from said consumer;

discarding said personal identification number after generation of said personal identification number authentication code and using said personal identification number authentication code when said electronic signature authentication is needed;

maintaining one or more data files related to the financing agreement and a reference to a template used to create the financing agreement along with the personal identification number authentication code, a document authentication code for the financing agreement, and a specific encryption algorithm used;

reproducing a copy of the financial agreement from the maintained data files, template reference, personal identification number authentication code, document authentication code for the financing agreement, and specific encryption algorithm;

generating a unique transaction identification for said financing in response to determining that said consumer is eligible for said financing; and electronically providing said unique transaction identification to said consumer via said network.

16. The computer-readable medium according to claim 15, wherein said modular electronic signature block is non-invasive, such that said generic modular electronic signature block does not modify a content of the plurality of agreements.

17. The computer-readable medium according to claim 15, wherein said financing agreement includes a plurality of sub-agreements, further comprising computer-readable instructions comprising instructions for appending said modular electronic signature block to each of the plurality of sub-agreements.

18. The computer-readable medium according to claim 15, wherein said personal identification number (PIN) is previously provided to said consumer and said computer-readable instructions for obtaining comprises instructions for receiving said PIN from said consumer in said modular electronic signature block.

19. The computer-readable medium according to claim 15, further comprising computer-readable instructions for generating said authentication code for said consumer.

20. The computer-readable medium according to claim 15, further comprising computer-readable instructions for generating the document authentication code for said financing agreement from consumer information and financing terms in the financing agreement.

21. The computer-readable medium according to claim 15, wherein said commercial transaction comprises an automobile purchase.

* * * * *